Feb. 5, 1952     L. C. NEUFELD     2,584,552
DIAPHRAGM PUMP
Filed April 12, 1948
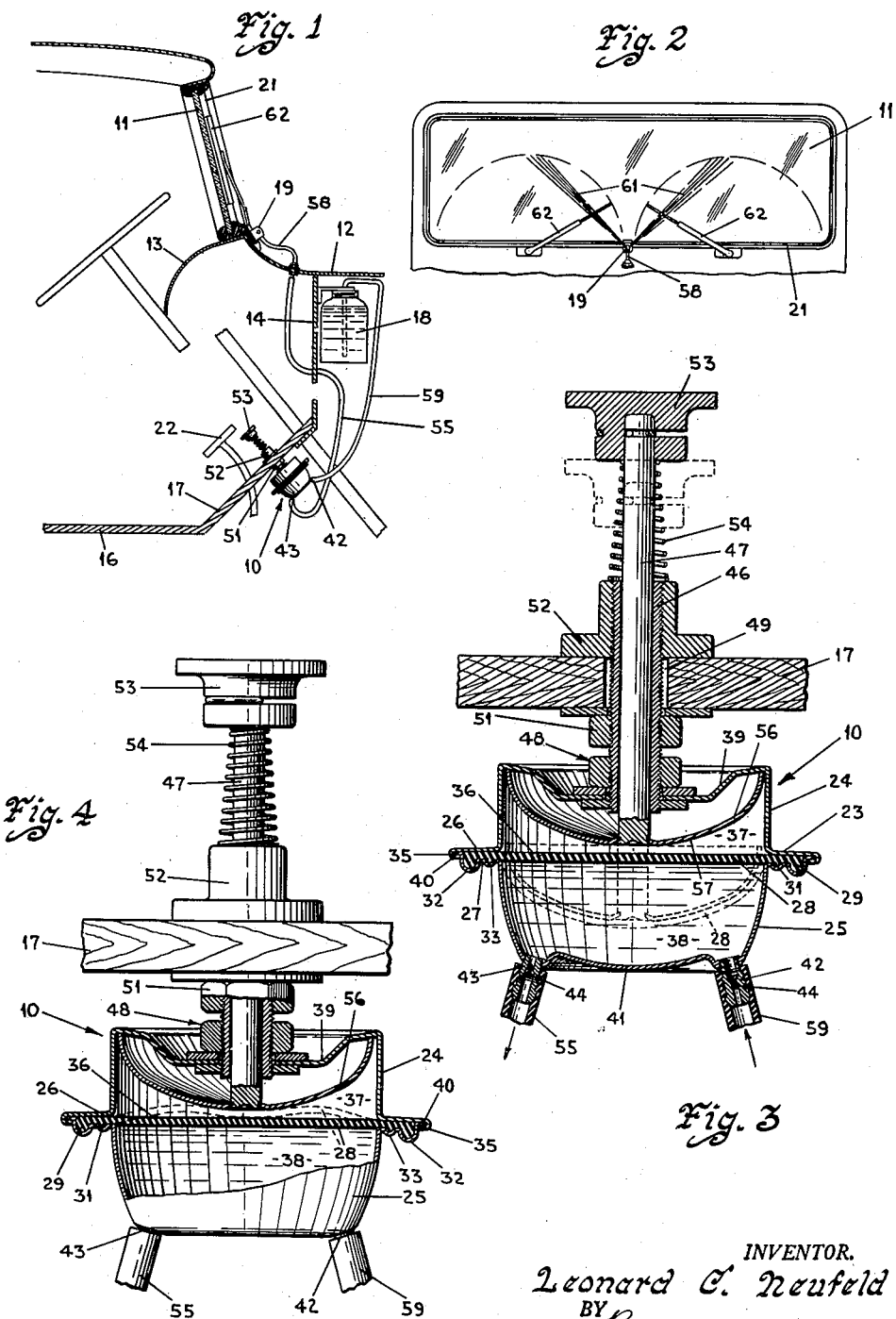
INVENTOR.
Leonard C. Neufeld
BY
Rudolph L. Lowell
Attorney Patented Feb. 5, 1952

2,584,552

UNITED STATES PATENT OFFICE 2,584,552

DIAPHRAGM PUMP

Leonard C. Neufeld, Des Moines, Iowa, assignor to The Delman Corporation, Des Moines, Iowa, a corporation of Iowa Application April 12, 1948, Serial No. 20,532

1 Claim. (Cl. 103—152)

This invention relates generally to diaphragm pumps and in particular to a diaphragm pump for a vehicle windshield washing system.

An object of this invention is to provide an improved diaphragm pump.

A further object of this invention is to provide a diaphragm pump in which an actuator or plunger for flexing the diaphragm, in the direction of its working movement, is formed with a diaphragm-engaging head member of a construction and shape to support the diaphragm against flexing movement in a reverse direction.

Another object of this invention is to provide a diaphragm pump in which a plunger for flexing the diaphragm in one direction has a diaphragm-engaging head member of a substantially dome shape adapted to progressively engage the diaphragm so that the diaphragm, in its maximum flexed position, is fully supported against flexing movement in an opposite direction.

A feature of this invention is found in the provision of a diaphragm pump in which a casing therefor is divided by a transversely arranged rubber diaphragm into a motor chamber and a working chamber. An actuator, for flexing the diaphragm toward the working chamber, includes a diaphragm engaging head member arranged in the motor chamber opposite the diaphragm. The surface of the head member, which is engageable with the diaphragm, is of a convexly curved shape and of an area substantially equal to an area of the diaphragm such that the diaphragm concurrently with being flexed, is progressively engaged by such surface so as to be fully supported thereby in its maximum flexed position, as defined by a limited working movement of the actuator. As a result, flexing movement of the diaphragm in a reverse direction relative to its working flexing movement is substantially eliminated, whereby a uniform and steady working pressure is developed in the working chamber.

Further objects, features and advantages of this invention will become apparent from the following description when taken in connection with the accompanying drawings, in which:

Fig. 1 is a fragmentary longitudinal foreshortened sectional view of a vehicle showing a windshield washer embodying the diaphragm pump of this invention, in assembly relation therewith;

Fig. 2 is a fragmentary front view of a vehicle showing the nozzle structure to which the pump supplies fluid under pressure;

Fig. 3 is an enlarged longitudinal sectional view of the pump, which is shown generally in Fig. 1; and Fig. 4 is an elevational view illustrated similarly to Fig. 3, with parts being shown in section and in changed positions relative to their showings in Fig. 3.

With reference to the drawings, the diaphragm pump of this invention, indicated generally as 10, is illustrated in Figs. 1 and 2 in assembly relation with a windshield washer system for an automobile having a one-piece windshield 11, an engine cowl 12 extended forwardly of the windshield, and an instrument panel or dashboard 13 located rearwardly thereof. The automobile is further equipped with a usual fire wall 14 and floorboard 16 having an upwardly and forwardly inclined portion 17 which joins with the lower end of the fire wall 14. The windshield washer system, besides the pump 10, includes a liquid glass container or reservoir 18, carried on the front side of the fire wall 14, and a nozzle structure 19, supported from the windshield molding strip 21 at a position to the lower or front side of the windshield and intermediate the ends thereof.

The pump 10 is supported from the floor board portion 17, at a position adjacent to the vehicle clutch pedal 22 and includes a casing 23 formed of two mating half sections 24 and 25 (Fig. 3) having laterally extended flanges 26 and 27, respectively, formed at their adjacent ends. Interposed between the casing sections 24 and 25 is a normally flat diaphragm member 28, of a rubber composition and circular in shape. A circumferential rib or projection 29 is extended laterally from the lower side of the diaphragm 28. Spaced inwardly from the rib 29 is a second circular rib 31 of a smaller size than the rib 29.

The flange 27 is formed with annular grooves 32 and 33 adapted to receive the ribs 29 and 31, respectively, therein. With the ribs 29 and 31 received within the grooves 32 and 33, respectively, the flange 26 is positioned against the peripheral portion of the top side 36 of the diaphram and its free end 35 is crimped or bent about the free end 40 of the flange 27, whereby the diaphragm 28 is positively clamped in a sealed engagement with the flanges 26 and 27. This relative arrangement and construction of the diaphragm ribs 29 and 31 and flange grooves 32 and 33, supports the peripheral edge of the diaphragm against spreading or flowing outwardly from between the flanges 26 and 27.

It is seen, therefore, that the diaphragm 28 is arranged transversely of the casing 23 so as to divide the casing into a motor chamber 37 and a liquid working chamber 38. For the purpose of convenience the closed end 39 of the casing section 24 shall be hereinafter referred to as the upper end of the casing 23, and the closed end 41 of the casing section 25 shall be referred to as the lower end of the casing 23.

Provided in the casing lower end 41, and for the working chamber 38, are a fluid inlet 42 and a fluid outlet 43. One way valves 44 for the inlet 42 and outlet 43, are of a usual type and reversely operable in response to the pressure of the liquid in the working chamber 38.

Projected upwardly from the casing upper side 39, and open to the motor chamber 37, is an externally threaded tubular bearing member 46 which slidably supports a diaphragm plunger or actuating member 47. The lower end of the bearing member 46 is secured to the casing top side 39 by a nut and washer assembly indicated generally at 48. In the assembly with a vehicle, the bearing 46 is inserted through an opening 49 formed in the floor board portion 17 so as to extend upwardly from the floor board at a position adjacent to the clutch pedal 22, as shown in Fig. 1. Clamping nuts 51 and 52, arranged to opposite sides of the floor board portion 17 and threadable on the bearing 46, support the casing 23 in a fixed position from the lower side of the floor board portion 17.

The plunger 47 is foot actuated and is provided at its upper end with a removable knob 53. A coil spring 54 mounted about the plunger 47, is arranged in compression between the knob member 53 and the clamping nut 52. The plunger is thus manually depressed and then returned by the action of the spring 54.

The lower end of the plunger 47 extends within the motor chamber 37 and is provided with a head member 56 which is of a substantially dish or dome shape having its continuous and smooth convexly curved side or surface 57 arranged opposite the top side 36 of the diaphragm 28. The head member 56 extends transversely across the casing 23 and is of a size such that the area of the surface 57 is substantially equal to the surface area of the diaphragm 28. On actuation of the plunger 47, the diaphragm 28 is engaged and flexed by the head member 56 for movement toward the working chamber 38. During this flexing movement of the diaphragm 28, the top side 36 thereof is progressively engaged by the surface 57 of the head member 56 so that at its maximum flexed position, indicated in dotted lines in Fig. 3, the diaphragm is fully supported by the head member 56 against a flexing movement in a reverse direction or toward the motor chamber 37.

As a result, the working flexing movement of the diaphragm 28 toward the working chamber 38 is continuous over the full working stroke of the plunger 47 so that a steady and uniform working pressure is applied on the liquid in the working chamber 38. The rate of flow of the liquid from the chamber 38 may thus be varied by varying the rate of speed at which the plunger 47 is depressed, and with the flow at any rate having steady flow characteristics.

This function of the pump is particularly desirable for windshield clearing purposes. Thus, as shown in Fig. 1, the pump outlet 43 is connected through tubes 55 and 58 with a nozzle structure 19 and the inlet 42 is connected through a tube 59 with the liquid reservoir 18. On depression of the plunger 47, and resultant movement of the diaphragm 28 from its full line position to its dotted line position, shown in Fig. 4, the inlet 42 is closed and fluid from the chamber 38 is discharged from the outlet 43 to the nozzle structure 19 (Fig. 2) which is formed with a pair of oppositely arranged outlets (not shown) adapted to direct liquid sprays 61 onto the windshield 11 and into the path of movement of the windshield wipers 62. Upon release of the plunger 47, the outlet 43 is closed and the inlet 42 is opened to provide for a supply of fluid from the reservoir 18 into the chamber 38.

Depending upon driving and windshield clearing conditions, it may at times be desirable to have a steady prolonged and relatively low pressure action of the sprays 61, or a steady relatively short and high pressure action of the sprays 61. Either of these flows are readily obtained by merely varying the rate of speed of actuation of the plunger 47. The maximum flexing movement of the diaphragm 28 is determined by the working stroke of the plunger 47. This working stroke is defined by the stop action of the spring 54 when it is fully compressed between the knob 53 and the clamping bolt 52.

In windshield clearing systems it is common practice to use water or an insect dissolving fluid as a cleaning fluid during summer operation of the vehicle. In cold weather sleet and ice resistant fluids are oftentimes used. To eliminate any injury to the pump, in the event any water remains in the clearing system during cold weather, it is contemplated that the head member 56, as shown in full lines in Figs. 3 and 4, be movable upwardly within the motor chamber 37 to a position out of engagement with the diaphragm 28, when the diaphragm is in its normal unflexed position and arranged in a plane extended transversely of the casing 23. As a result, on any freezing of the liquid, or a portion thereof, in the chamber 38, the diaphragm 28 is capable of being flexed upwardly toward the motor chamber 37, to its dotted line position indicated in Fig. 4. This flexing movement is permitted by virtue of the convexly curved shape of the head member 56.

From a consideration of the above description it is seen that the invention provides a diaphragm pump which is of a compact and simple construction and efficient in operation to provide for a steady flow of liquid under pressure therefrom, regardless of the rate of flow of such liquid. Further, the diaphragm is positively retained against movement relative to the pump casing so as to insure a positive operation of the pump over a prolonged period of use.

Although the invention has been described with respect to a preferred embodiment thereof, it is to be understood that it is not to be so limited since changes can be made therein which are within the full intended scope of this invention as defined by the appended claim.

I claim:

In a diaphragm pump, a casing having a flexible normally flat diaphragm member extending transversely across the casing to form a motor chamber and a working chamber therein, fluid inlet and outlet means for said working chamber, means for flexing said diaphragm toward said working chamber including a plunger in said motor chamber having a head member in said motor chamber formed with a continuously smooth convexly curved surface arranged opposite said diaphragm, said head member being normally spaced from the diaphragm during inoperative periods of the pump, said diaphragm throughout its extent within the casing being flexibly movable transversely of said continuously smooth surface of the head member at all moved positions of the plunger, the maximum transverse dimension of said head member being substantially equal to the transverse dimension of that part of the diaphragm located within the confines of said casing, so that on movement of the plunger toward the working chamber, said part of the diaphragm is progressively flexed into full bearing engagement with said continuously smooth convexly curved surface of the head member and is fully supported thereby against flexing movement toward said motor chamber.

LEONARD C. NEUFELD.

REFERENCES CITED

The following references are of record in the file of this patent:

UNITED STATES PATENTS

| Number | Name | Date |
|---|---|---|
| 1,568,091 | Schatz | Jan. 5, 1926 |
| 1,965,497 | Johnson | July 3, 1934 |
| 1,976,098 | Smith | Oct. 9, 1934 |

FOREIGN PATENTS

| Number | Country | Date |
|---|---|---|
| 60,380 | Denmark | Nov. 30, 1942 |
| 248,861 | Italy | 1926 |
| 489,746 | Great Britain | Aug. 3, 1938 |